(12) United States Patent
Myerholtz et al.

(10) Patent No.: US 10,101,055 B2
(45) Date of Patent: Oct. 16, 2018

(54) SYSTEM AND METHOD FOR HEATING A PIPELINE USING HEATED LINES

(71) Applicant: THERMA-STOR LLC, Madison, WI (US)

(72) Inventors: Robert M. Myerholtz, Weston, OH (US); Larry L. Dancey, Melfort (CA)

(73) Assignee: Therma-Stor LLC, Madison, WI (US)

( * ) Notice: Subject to any disclaimer, the term of this patent is extended or adjusted under 35 U.S.C. 154(b) by 0 days.

(21) Appl. No.: 15/724,351

(22) Filed: Oct. 4, 2017

(65) Prior Publication Data

US 2018/0023843 A1    Jan. 25, 2018

Related U.S. Application Data

(63) Continuation of application No. 14/626,686, filed on Dec. 19, 2015, now Pat. No. 9,810,448.

(51) Int. Cl.
*F24H 1/14* (2006.01)

(52) U.S. Cl.
CPC .................. *F24H 1/142* (2013.01)

(58) Field of Classification Search
CPC ......... F24H 1/142; H05B 3/0052; H05B 3/58; H05B 2203/005
USPC ........ 219/483, 486, 494; 392/304, 450, 454, 392/465, 461, 468
See application file for complete search history.

(56) References Cited

U.S. PATENT DOCUMENTS

| | | |
|---|---|---|
| 2,778,609 A | 1/1957 | Peeps |
| 3,151,633 A | 10/1964 | Shuman |
| 3,269,422 A | 8/1966 | Matthews et al. |
| 3,548,158 A | 12/1970 | McCaskill |
| 3,782,452 A | 1/1974 | Ceplon |
| 4,203,186 A | 5/1980 | Horner |
| 4,262,406 A * | 4/1981 | Fredrickson .......... B65B 13/345 24/200 |
| 4,279,270 A | 7/1981 | Francis, Jr. |
| 4,347,433 A | 8/1982 | Wojtecki et al. |
| 4,401,156 A | 8/1983 | Wojtecki et al. |
| 4,679,598 A | 7/1987 | Trevor |
| 5,040,751 A * | 8/1991 | Holub ....................... F16L 3/11 248/62 |
| 5,086,836 A | 2/1992 | Barth et al. |
| 5,714,738 A | 2/1998 | Hauschulz |
| 6,076,780 A * | 6/2000 | Honnecke ............... F16L 3/133 248/59 |
| 6,158,231 A | 12/2000 | Singer |
| 6,316,751 B1 | 11/2001 | Wyke |
| 6,345,644 B1 | 2/2002 | McLeod |

(Continued)

*Primary Examiner* — Mark Paschall
(74) *Attorney, Agent, or Firm* — Baker Botts L.L.P.

(57) ABSTRACT

A system for heating a pipeline comprises a heater that heats a fluid, a supply line, and a return line. Heated fluid flows through the supply line away from the heater and through the return line back to the heater. The system further comprises a strap having a first end, a second end, and a middle portion between the first end and the second end. The strap forms a first pocket when the first end is folded over and attached to the middle portion of the strap. The strap forms a second pocket when the second end is folded over and attached to the middle portion of the strap. The first pocket holds the supply line in thermal contact with a first portion of the pipeline. The second pocket holds the return line in thermal contact with a second portion of the pipeline.

20 Claims, 5 Drawing Sheets

(56) References Cited

U.S. PATENT DOCUMENTS

| | | |
|---|---|---|
| 6,588,500 B2 | 7/2003 | Lewis |
| 6,595,241 B2 | 7/2003 | Chen |
| 6,776,227 B2 | 8/2004 | Beida et al. |
| 6,810,916 B2 | 11/2004 | Thompson |
| 6,955,221 B2 | 10/2005 | Bursaux |
| 7,033,113 B2 * | 4/2006 | March ................... F16L 9/18 |
| | | 405/154.1 |
| 7,066,729 B1 | 6/2006 | Rajewski |
| 7,182,126 B2 * | 2/2007 | Heise ................... E03B 7/12 |
| | | 165/142 |
| 7,694,717 B2 | 4/2010 | Bonner et al. |
| 7,919,733 B2 * | 4/2011 | Ellis ................... F16L 53/008 |
| | | 138/112 |
| 9,347,596 B2 | 5/2016 | Wortmann |
| 9,448,011 B2 | 9/2016 | MacKelvie |
| 2014/0029925 A1 * | 1/2014 | Smith ................... H05B 3/02 |
| | | 392/468 |
| 2014/0311582 A1 | 10/2014 | Bunch, Jr. et al. |

* cited by examiner

SYSTEM AND METHOD FOR HEATING A PIPELINE USING HEATED LINES

RELATED APPLICATION

This application is a continuation of pending U.S. patent application Ser. No. 14/626,686 filed Feb. 19, 2015, the disclosure of which is hereby incorporated by reference herein.

TECHNICAL FIELD

This invention relates generally to a heating system and specifically to a system and method for heating a pipeline using heated lines.

BACKGROUND OF THE INVENTION

Pipelines are used in various industries to transport fluids. These pipelines are sometimes located in areas with very low temperatures. It is often necessary to keep pipelines warm to prevent the fluids inside the pipeline from freezing. Often pipelines are heated by makeshift solutions that are cumbersome, difficult to install and deploy, and usually result in substantial heat loss.

SUMMARY OF THE INVENTION

According to embodiments of the present disclosure, disadvantages and problems associated with previous pipeline heating systems and methods may be reduced or eliminated.

In one embodiment, a system for heating a pipeline comprises a heater operable to heat a fluid, a supply line and a return line. A first strap is positioned at a first portion of a pipeline. A first pocket of the first strap holds the supply line in thermal contact with the first portion of the pipeline. A second pocket of the first strap holds the return line in thermal contact with the first portion of the pipeline. A second strap is positioned at a second portion of the pipeline. A third pocket of the second strap holds the supply line in thermal contact with the second portion of the pipeline. A fourth pocket of the second strap holds the return line in thermal contact with the second portion of the pipeline.

Certain embodiments may provide one or more advantages. One advantage of one embodiment may include the ability to heat a pipeline by efficiently deploying a pipeline heating system without shutting down the operation of the pipeline. Another advantage may include the ability to deploy the same heating system on multiple pipelines at different times of operation. One advantage of another embodiment may be the ability to change the configuration of the heating system to more efficiently heat a pipeline. Still another advantage of the present disclosure includes the ability to heat pipelines that are difficult to access.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE DRAWINGS

Figure 1:
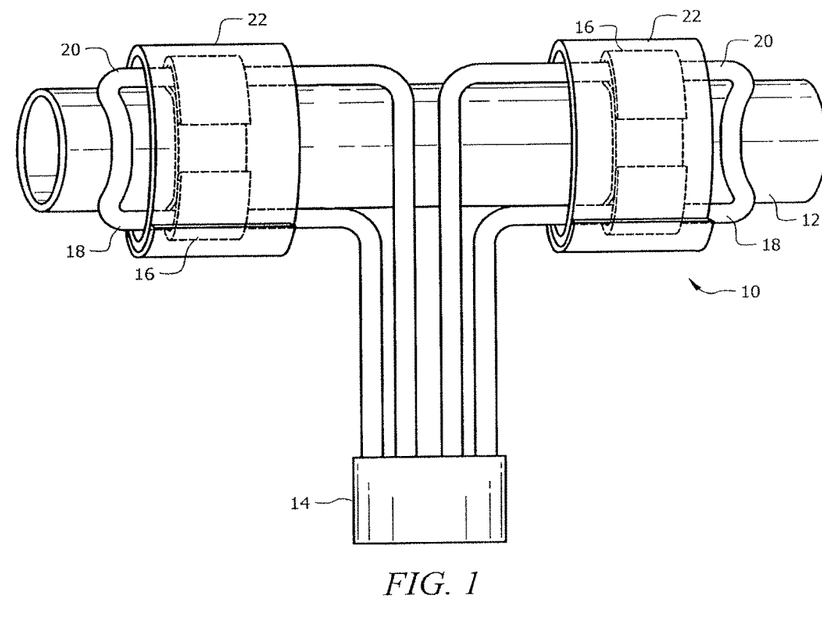
FIG. 1 illustrates a top-down view of a system for heating a pipeline.

FIG. 1 illustrates a top-down view of one embodiment of system 10 for heating a pipeline 12 using a heater 14. System 10 includes straps 16, a supply line 18, a return line 20, and insulated blankets 22. Pipeline 12 may transport any fluids such as water, oil, liquefied natural gas, sewage, slurry, biofuels, etc. In order to prevent the fluids inside pipeline 12 from freezing, system 10 uses heated fluid flowing through supply line 18 and return line 20 to keep the pipeline warm. In system 10, heater 14 heats the fluid which flows through supply line 18. Supply line 18 runs alongside pipeline 12 and is positioned in thermal contact with pipeline 12 using straps 16. In one embodiment, supply line 18 eventually loops over pipeline 12 and is coupled to return line 20. Return line 20 carries the heated fluid back to heater 14. Return line 20 runs alongside pipeline 12 and is positioned in thermal contact with pipeline 12 using straps 16. One of skill in the art will appreciate that supply line 18 and return line 20 may run alongside pipeline 12 for any suitable length depending on the length pipeline 12, the portions of pipeline 12 that are to be heated, and the nature of the heating operation. An insulated blanket 22 covers at least a portion of supply line 18, return line 20, and pipeline 12. Heater 14 may then heat the returned fluid and pump it back out through supply line 18 to heat pipeline 12.

Pipeline 12 may be made of any material, including a material with metallic properties such as steel or carbon steel. Pipeline 12 may have any appropriate dimensions including dimensions that are smaller or larger than the dimensions of supply line 18 and return line 20. Pipeline 12 may be of any shape including any cylindrical or non-cylindrical shape. Pipeline 12 may run on the surface of the ground, be partially underground, be partially or entirely submerged, or be elevated over the surface of the ground. Pipeline 12 may be partially filled with a fluid, fully filled with a fluid, or be empty at various times of operation. Pipeline 12 may contain either or both flowing fluids and stagnant fluids. Pipeline 12 may also contain solids such as impurities, frozen fluids, and slurry at various times of operation.

Supply line 18 may be made of any material including a thermally conductive material, and may have any suitable dimensions including dimensions that are different from the dimensions of return line 20 and pipeline 12. Supply line 18 may be made of a flexible or a malleable material. Supply line 18 may take any shape including any cylindrical or non-cylindrical shape. In one embodiment, supply line 18 may have a convex surface and/or a concave surface. Supply line 18 may be partially filled with fluid, fully filled with fluid, or be empty at various times of operation. Supply line 18 may contain glycol, water, oil, or any other suitable fluid that is heated by heater 14. Supply line 18 may contain both flowing fluids and stagnant fluids at various times of operation. Supply line 18 may also contain solids such as impurities, frozen liquids, and slurry at various times of operation. In one embodiment, supply line 18 may be connected to heater 14. In another embodiment, supply line 18 may be connected to heater 14 at one end and to return line 20 at the other end.

Return line 20 may be made of any material, including a thermally conductive material, and may have any suitable dimensions including dimensions that are different from the dimensions of supply line 18 and pipeline 12. Return line 20 may be made of a flexible or a malleable material. Return line 20 may take any shape including any cylindrical or non-cylindrical shape. In one embodiment, return line 20 may have a convex surface and/or a concave surface. Return line 20 may be partially filled with fluid, fully filled with fluid, or be empty at various times of operation. Return line 20 may contain glycol, water, oil, or any other suitable fluid that is heated by heater 14. Return line 20 may contain both flowing fluids and stagnant fluids at various times of operation. Return line 20 may also contain solids such as impurities, frozen liquids, and slurry at various times of operation. In one embodiment, return line 20 may be connected to heater 14. In another embodiment, return line 20 may be connected to a heater 14 at one end and supply line 18 at the other end. In such embodiments, return line 20 may carry fluids back to heater 14.

Heater 14 may be any system, device, or apparatus for heating a fluid. Heater 14 may be mobile or stationary. Heater 14 may be powered by any power source including generators, solar panels, batteries, the power grid, hydroelectric power, wind turbines, geothermal energy or any other power source. Heater 14 may have multiple connections to connect multiple lines, such as lines 18 and 20, and may be operable to heat fluids in one or more tanks. Heater 14 may heat fluids to any suitable temperature. Heater 14 may also include or be coupled to a pump for pumping the heated fluid into the heated source and return lines 18 and 20, respectively. In one embodiment, heater 14 may be connected to any number of supply line 18 and return line 20 pairs to create heated fluid loops.

Insulated blanket 22 may contain any thermally insulated material such as fiberglass, mineral wool, cellulose, insulated foam, etc. Insulated blanket 22 may be made of any material including any fabric or polymer. Insulated blanket 22 may have fasteners attached to the ends of insulated blanket 22 to connect the two ends of insulated blanket 22 together. Insulated blanket 22 may additionally contain eyelets for tying down insulated blanket 22 over pipeline 12 to pegs or other fasteners attached to the ground or pipeline 12. Insulated blanket 22 may have weights attached to it for ease of installation and removal from pipeline 12.

Strap 16 may be made of any combination of a flexible material such as VELCRO® Brand touch fastener and a malleable conductive material such as light aluminum that can be manipulated to position lines 18 and 20 with respect to pipeline 12. Strap 16 may be made of any combination of touch fastening material comprising hook-and-loop fasteners, thermally conductive material, or any other appropriate material. One side of strap 16 may be adhesive. In another embodiment, one side of strap 16 may be magnetic. Strap 16 may be made of any combination of thermally conductive and thermally insulating material. Strap 16 may have any number of ends. In one embodiment, strap 16 may have a body portion and two ends. As discussed in relation to FIG. 5A below, in one embodiment, strap 16 may have a body portion and more than two ends.

Figure 2A:
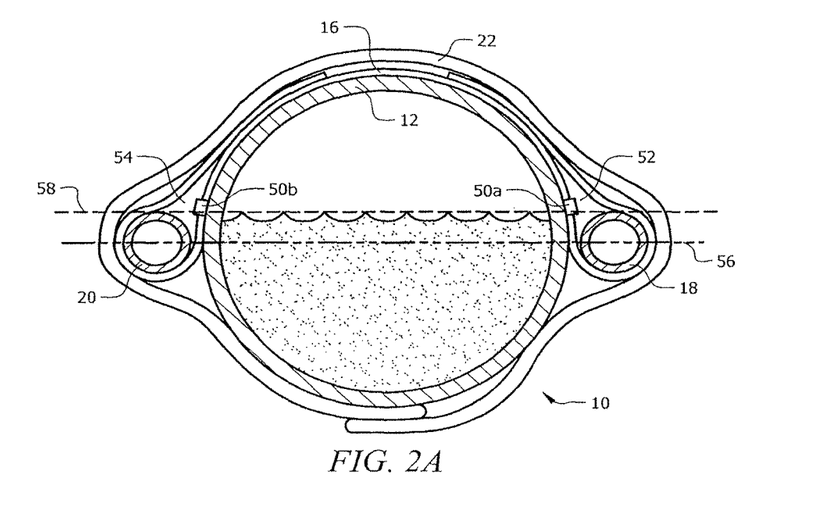
FIG. 2A illustrates one embodiment of a cross-section of a pipeline and a pipeline heating system.

FIG. 2A illustrates one embodiment of a cross-section of pipeline 12 in operation with a strap 16, insulated blanket 22, supply line 18, return line 20, and clasps 50*a* and 50*b*.

Clasps 50*a* and 50*b* may be removably coupled to pipeline 12. Clasps 50*a* and 50*b* may be made of any material including a thermally conductive or thermally insulating material. In one embodiment, clasps 50*a* and 50*b* may be made of a magnetic material and may be magnetically coupled to pipeline 12. In another embodiment, clasps 50*a* and 50*b* may have adhesive sides to facilitate removable coupling with pipeline 12. Clasps 50*a* and 50*b* may each have a concave inner surface through which different ends of a strap 16 may be passed to further facilitate coupling with pipeline 12, as explained in greater detail below. Clasps 50*a* and 50*b* may each contain an eyelet.

The embodiment illustrated in FIG. 2A shows pipeline 12 as a cylinder. In this embodiment, pipeline 12 has an equator 56 that divides pipeline 12 into two substantially equal halves. In other embodiments where pipeline 12 is not cylindrical, pipeline 12 may have a plane that divides it into different portions.

Pipeline 12 may be filled to fill level 58 with any fluid. Fill level 58 may be the level to which fluid typically rises (excluding aberrations such as splashes, temporary stoppages, etc.) inside pipeline 12. Fill level 58 may be at, above, or below equator 56. Fill level 58 of pipeline 12 may vary depending, among other factors, on the dimensions of pipeline 12, the volume of fluid inside pipeline 12, and the type of fluid inside pipeline 12. In particular embodiments, fill level 58 may be at high, medium, or low level. Fill level 58 may be high if it is above equator 56. Fill level 58 may be medium if it is approximately at the equator 56. Fill level 58 may be low if it is below equator 56. In some situations, for example when the fluid inside pipeline 12 is primarily gaseous or when pipeline 12 is empty, pipeline 12 may not have a fill level 58. An operator may determine or approximate whether fill level 58 of pipeline 12 is low, medium, or high through any appropriate means.

In operation of one embodiment of system 10, pipeline 12 may be located in a cold temperature environment and may contain a fluid. To prevent the fluid from freezing, pipeline 12 may be heated by using supply line 18 and return line 20.

In the present embodiment, fill level 58 of pipeline 12 is near equator 56 and clasps 50*a* and 50*b* are removably coupled to pipeline 12 near equator 56. However, it will be appreciated that for different embodiments of the present disclosure, fill level 58 of pipeline 12 may be at, above, or below equator 56. As discussed below in reference to FIGS. 3A and 3B, clasps 50*a* and 50*b* may be removably coupled to different portions of pipeline 12 for different advantageous reasons depending upon fill level 58 of pipeline 12. In the present embodiment, strap 16 is placed on pipeline 12 and a first end of strap 16 loops through an eyelet in clasp 50*a*. In this embodiment, strap 16 has two ends and one side of strap 16 is at least partially made of a touch fastening material. However, it will be appreciated that in other embodiments, strap 16 may have more than two ends, strap 16 may be made of any material, and strap 16 may be coupled with any exposed portion of pipeline 12.

In the present embodiment, one end of strap 16 is folded over and attached to the body of strap 16 at a middle portion of strap 16. A first end of strap 16 is attached to the body of strap 16 by connecting hooks of the touch fastening material to loops of the touch fastening material. Attaching the end of the strap 16 to the body of strap 16 forms a first pocket 52. First pocket 52 rests on a portion of pipeline 12 and holds supply line 18 in thermal contact with pipeline 12. Clasp 50a secures first pocket 52 onto pipeline 12. Clasp 50a may also come in thermal contact with supply line 18 and pipeline 12 thereby facilitating heat transfer from supply line 18 to pipeline 12.

In the present embodiment, a second end of strap 16 loops through an eyelet in clasp 50b. The second end of strap 16 folds over and attaches to the body of strap 16 at the middle portion of strap 16. The second end of strap 16 attaches to the body of strap 16 by connecting hooks of the touch fastening material to the loops of the touch fastening material. Attaching the second end of strap 16 to the body of strap 16 forms a second pocket 54. Second pocket 54 rests on another portion of pipeline 12 and holds return line 20 in thermal contact with pipeline 12. Clasp 50b secures second pocket 54 onto pipeline 12. Clasp 50b may also come in thermal contact with return line 20 and pipeline 12 thereby facilitating heat transfer from return line 20 to pipeline 12.

Although the present embodiment uses hooks and loops to attach the first and second ends of strap 16 to the body of strap 16, it will be appreciated that the ends of strap 16 may be attached to the body of strap 16 using any suitable means. In one embodiment, strap 16 may be at least partially made of a malleable material and pockets 52 and 54 may be formed by bending the ends of strap 16 into pockets 52 and 54. In another embodiment, pockets 52 and 54 may be formed by folding over the ends of strap 16 and using a clasp 50, clip or any other fastening means to attach strap 16 ends to the body of strap 16. In all such embodiments, pockets 52 and 54 may be easily formed and altered by manipulating strap 16.

Additionally, although the present embodiment uses clasps 50a and 50b to deploy system 10, it will be appreciated that clasps 50a and 50b are not necessary. First pocket 52 and second pocket 54 may be formed by attaching a first end of strap 16 to the body portion of strap 16 and by attaching a second end of strap 16 to the body portion of strap 16. Strap 16 may be placed on any exposed portion of pipeline 12. Supply line 18 and return line 20 may be placed inside first pocket 52 and second pocket 54. Pockets 52 and 54 may be positioned in thermal contact with pipeline 12 by any suitable means, including by being wrapped in insulated blanket 22 or by being held in place by the weight of supply line 18 and return line 20.

In the present embodiment, supply line 18 is held in first pocket 52 and is connected to heater 14. In this example embodiment, supply line 18 carries heated glycol. In other embodiments, supply line 18 may carry any other heated fluid that is appropriate for the particular use. Heat energy may transfer from the heated glycol to the fluid inside pipeline 12 through a series of heat transfers. First, heat energy transfers from the heated glycol to supply line 18. Next, heat energy transfers from supply line 18 to strap 16. Heat energy then transfers from strap 16 to pipeline 12. And finally, heat energy transfers from pipeline 12 to the fluid inside pipeline 12. It will be appreciated that the above-identified heat transfers are just one example and that other heat transfers between the heated fluid carried by lines 18 and 20 to the fluid in pipeline 12 may occur using system 10. As the heated glycol flows through supply line 18, the heated glycol may cool as heat energy is transferred from the glycol to supply line 18 and further to the fluid in pipeline 12. In this embodiment, supply line 18 loops over pipeline 12 and is coupled to return line 20. In other embodiments, supply line 18 may connect to a second heater 14, a pump, or a reservoir for collecting the heated fluid.

In the present embodiment, heated glycol continues to flow through return line 20. Return line 20 is placed in thermal contact with another portion of pipeline 12 through second pocket 54. Heat energy may transfer from the heated glycol to the fluid in pipeline 12. In this embodiment, return line 20 may return the glycol to heater 14 to be reheated and pumped back into supply line 18. In other embodiments, both ends of return line 20 may be connected to heaters 14. In another embodiment, one end of return line 20 may be connected to a heater 14 and the other end may be connected to a pump or a reservoir for collecting the heated fluid.

In the present embodiment, insulated blanket 22 is placed over all or a portion of pipeline 12 after supply line 18 and return line 20 have been held in place using strap 16. Insulated blanket 22 may be held in place by weights, by being tied to pegs fixed in the ground, or by any other means of holding insulated blanket 22 in place.

Figure 2B:
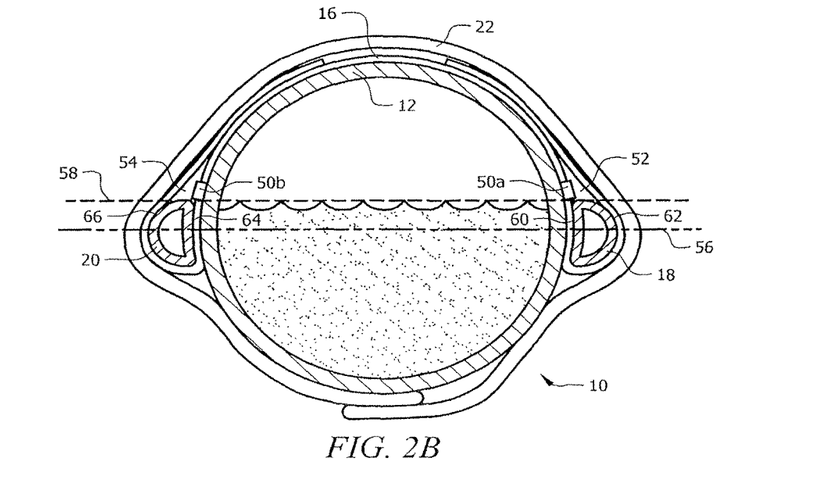
FIG. 2B illustrates another embodiment of a cross-section of a pipeline and a pipeline heating system with modified heating lines.

FIG. 2B illustrates another embodiment of a cross-section of a pipeline 12 and a pipeline heating system with modified lines 18 and 20. In this embodiment, supply line 18 has a concave surface 60 and a convex surface 62. Similarly, return line 20 also has a concave surface 64 and a convex surface 66. In operation, supply line 18 and return line 20 of system 10 are placed in pockets 52 and 54 so that concave surfaces 60 and 64 are adjacent to pipeline 12. Placing concave surfaces 60 and 64 of supply line 18 and return line 20 adjacent to pipeline 12 increases the surface area of supply line 18 and return line 20 that come in thermal contact with pipeline 12. Maximizing surface area contact between supply line 18 or return line 20 and pipeline 12 reduces heat loss and increases conductive heat transfer from supply line 18 and return line 20 to pipeline 12. Supply line 18 and return line 20 with concave surfaces 60, 64 and convex surfaces 62, 66 may be used in conjunction with any of the other embodiments illustrated in FIGS. 1-5.

Figure 3A:
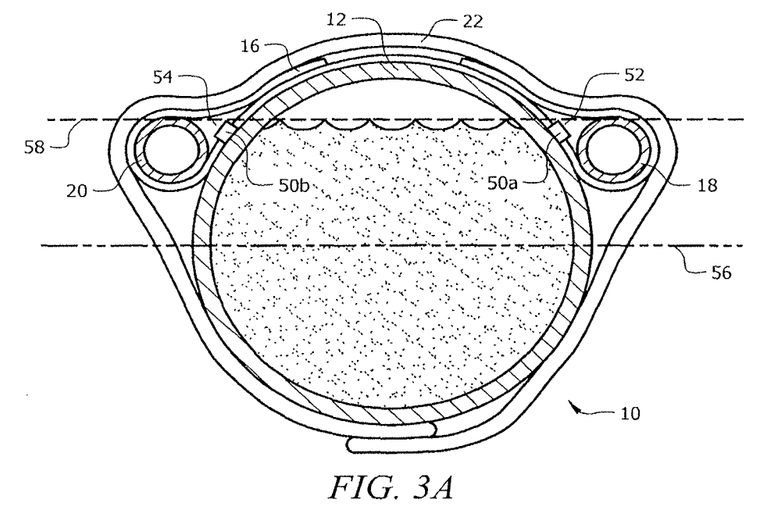
FIG. 3A illustrates another embodiment of a cross-section of a pipeline and a pipeline heating system in a particular configuration.

FIG. 3A illustrates another embodiment of a cross-section of pipeline 12 and heating system 10 in a particular configuration. In this embodiment, pipeline 12 is cylindrical and pipeline 12 has an equator 56. Fill level 58 of pipeline 12 is above equator 56. It will be appreciated, however, that in other embodiments where pipeline 12 is not cylindrical, pipeline 12 may have a plane that divides it into different portions.

As one example of the operation of system 10, described in relation to FIG. 3A, the present embodiment uses a short strap 16 to deploy system 10. Pockets 52 and 54 hold supply lines 18 and 20, respectively, in thermal contact with pipeline 12 below fill level 58 but above equator 56. Placing supply line 18 and return line 20 at or above equator 56 of pipeline 12 maximizes the surface area of supply line 18 and return line 20 that comes in thermal contact with pipeline 12. Placing supply line 18 and return line 20 above equator 56 may be particularly advantageous when fill level 58 of pipeline 12 is above equator 56. Placing strap 16 on pipeline 12 such that supply line 18 and return line 20 come in thermal contact with pipeline 12 above equator 56 and below fill level 58 of pipeline 12 may increase heat transfer to the liquid inside pipeline 12 and reduce heat loss. In one embodiment, where pipeline 12 runs substantially parallel to the ground, supply line 18 and return line 20 may maintain contact with pipeline 12 without using clasps 50a and 50b.

In certain situations, it may be advantageous to place supply line 18 and return line 20 near the fill level 58 of pipeline 12 because the fluid is more likely to freeze at or near its surface.

Figure 3B:
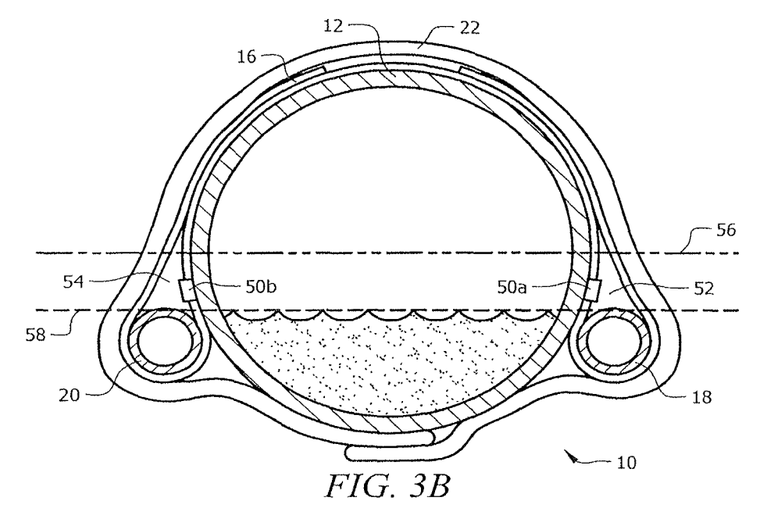
FIG. 3B illustrates another embodiment of a cross-section of a pipeline and a pipeline heating system in another configuration.

FIG. 3B illustrates another embodiment of a cross-section of pipeline 12 and heating system 10 in a particular configuration. In this embodiment, pipeline 12 has an equator 56, and fill level 58 of pipeline 12 is below equator 56. Clasps 50a and 50b are removably coupled to pipeline 12 below fill level 58.

As one example of the operation of system 10, described in relation to FIG. 3B, pockets 52 and 54 hold lines 18 and 20, respectively, in thermal contact with pipeline 12 by removably coupling clasps 50a and 50b to pipeline 12 and looping strap 16 through clasps 50a and 50b to form pockets 52 and 54. Supply line 18 and return line 20 are then placed in pockets 52 and 54, respectively. Using clasps 50a and 50b may be particularly advantageous when pockets 52 and 54 are placed below equator 56 on pipeline 12. In such an embodiment, pockets 52 and 54 may be coupled to pipeline 12 by clasps 50a and 50b to prevent pockets 52 and 54 from losing thermal contact with pipeline 12. In one embodiment, clasps 50a and 50b may be magnetic and clasps 50a and 50b may be magnetically coupled to pipeline 12. Using magnetic clasps 50a and 50b may have the additional advantages of easy installation and removal of heating system 10 on pipeline 12, providing support for strap 16 during installation of system 10, and requiring no additional structure to be welded onto current and future pipelines 12.

In one embodiment, upon determining whether fill level 58 of pipeline 12 is low, medium, or high, an operator my change the positioning of supply line 18 and return line 20 on pipeline 12 in relation to fill level 58 by manipulating strap 16, changing the positioning of removably coupled clasps 50a and 50b on pipeline 12, altering the length of strap 16, or by any other means to place supply line 18 and return line 20 at or below fill level 58.

Figure 4A:
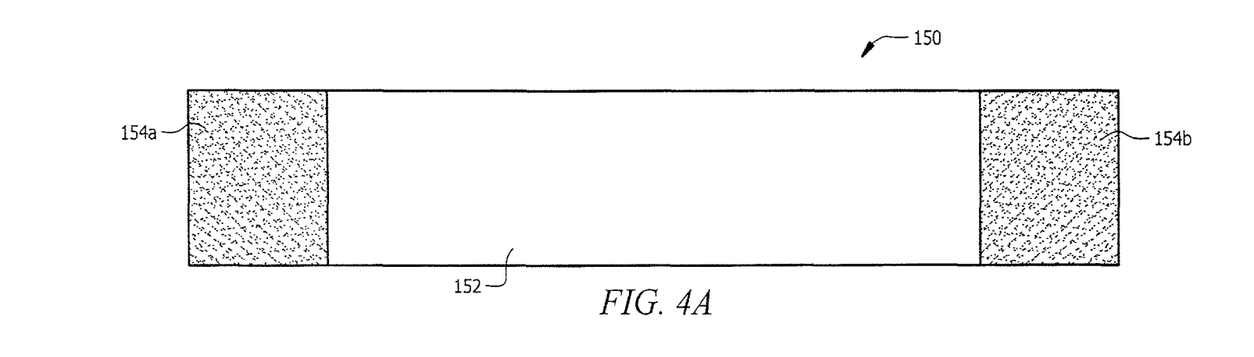
FIG. 4A illustrates one embodiment of one side of a strap.

FIG. 4A illustrates one embodiment of a first side 150 of strap 16. In this embodiment, first side 150 is made of a combination of thermally conductive material and hook fastening material. First side 150 has a body 152, a first end 154a, and a second end 154b. Body 152 of first side 150 is made of thermally conductive material. In one embodiment, ends 154a and 154b may be made of hook fastening material. In operation, first side 150 comes in contact with pipeline 12 and transfers heat across the length of first side 150 through body 152 and into pipeline 12. Although this embodiment discloses a particular first side 150 of strap 16, it will be appreciated that in other embodiments, first side 150 of strap 16 may be made of any combination of thermally conductive material, hook fastening material, or any other suitable material. In one embodiment, first side 150 may be entirely made of a thermally conductive material.

Figure 4B:
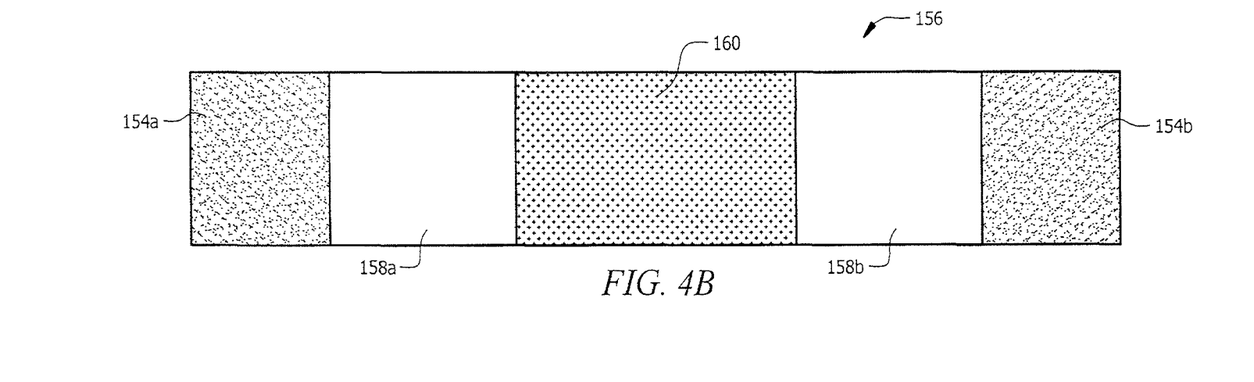
FIG. 4B illustrates one embodiment of another side of strap.

FIG. 4B illustrates one embodiment of a second side 156 of strap 16. In this embodiment, second side 156 is made of a combination of thermally conductive material and hook fastening material. Here, the two ends 154a and 154b are adjacent to thermally conductive portions 158a and 158b respectively. Thermally conductive portions 158a and 158b are connected by a body 160 that is made of a hook fastening material.

In operation, second side 156 faces away from pipeline 12 and comes in contact with supply line 18 and return line 20. In one embodiment, supply line 18 is placed on thermally conductive portion 158a and heat is transferred from second side 156 to first side 150 through conductive portion 158a. Similarly, return line 20 is placed on thermally conductive portion 158b and heat is transferred from second side 156 to first side 150 through conductive portion 158b.

Although this embodiment discloses a particular second side 156 of strap 16, it will be appreciated that in other embodiments, second side 156 of strap 16 may be made of any combination of thermally conductive, hook fastening, or any other material. In one embodiment, second side 156 may be entirely made of a thermally conductive material.

Figure 5A:
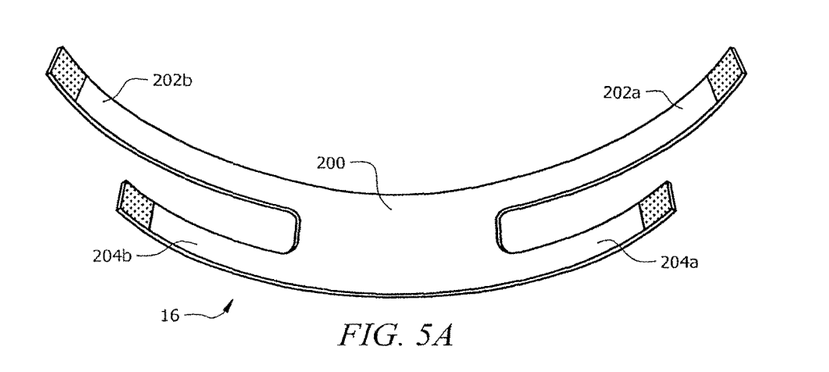
FIG. 5A illustrates one embodiment of a strap with four ends.

FIG. 5A illustrates an embodiment of strap 16 with four ends 202a, 202b, 204a, and 204b. In this embodiment, strap 16 has a body portion 200, first ends 202a and 202b, and second ends 204a and 204b. First ends 202a and 202b are longer than second ends 204a and 204b. In other embodiments, first ends 202a and 202b may be the same length as or shorter than second ends 204a and 204b. As discussed above in relation to FIGS. 4A and 4B, strap 16 may be made of any material including any combination of thermally conductive material and hook-fastening material. In operation, ends 202a, 202b, 204a, and 204b, may be folded over and attached to body portion 200 to create four pockets. Because ends 202a, 202b, 204a, and 204b may all be of different lengths, the four pockets may be staggered. Although the present embodiment has four ends 202a, 202b, 204a, and 204b, in other embodiments, strap 16 may have any number of ends that may be manipulated to form any number of pockets. Strap 16 with multiple ends may be used in conjunction with any of the other embodiments illustrated in FIGS. 1-5.

Figure 5B:
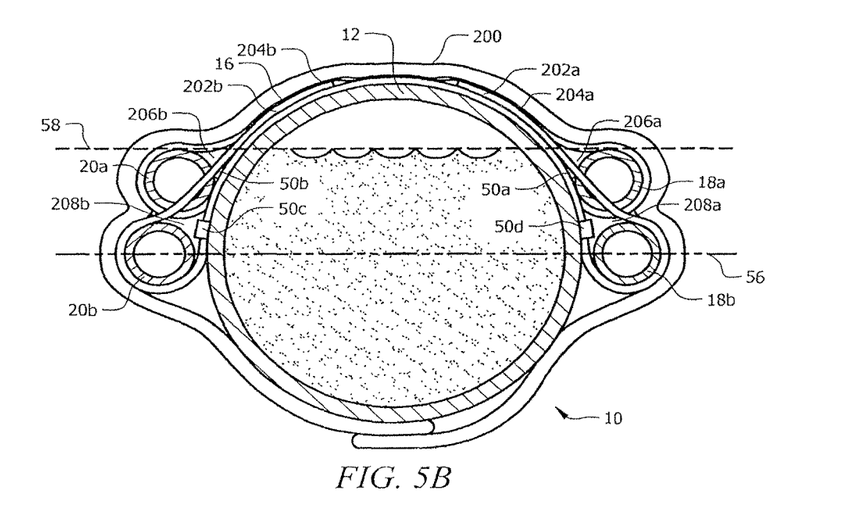
FIG. 5B illustrates another embodiment of a cross-section of a pipeline and a pipeline heating system using a strap with four ends.

FIG. 5B illustrates an embodiment of a cross-section of pipeline 12 and heating system 10 deployed using strap 16 with four ends 202a, 202b, 204a, and 204b. Strap 16 may be made of any material as discussed above in relation to FIGS. 4A and 4B. As one example of the operation of system 10, ends 202a, 202b, 204a, and 204b of strap 16 of the present embodiment are folded over and attached to the body of strap 16 to foul' four pockets 206a, 206b, 208a, and 208b. In this embodiment, first ends 202a and 202b are folded over and attached to body 200 of strap 16 to form pockets 208a and 208b that can hold lines 18a and 20a in thermal contact with pipeline 12. Second ends 204a and 204b are also folded over and attached to body 200 of strap 16 to form pockets 206a and 206b that can hold another two lines 18b and 20b in thermal contact with pipeline 12. Strap 16 is placed on pipeline 12. Two heated supply lines 18a and 18b and two heated return lines 20a and 20b can be placed inside pockets 206a, 208a, 206b, and 208b, respectively. Clasps 50a-d are used to secure strap 16 on pipeline 12. Additionally, in other embodiments, strap 16 may have any number of ends to form any number of pockets to hold any number of lines 18 and 20 in thermal contact with pipeline 12. Strap 16 may also be secured onto pipeline 12 without using clasps 50a and 50b.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A system for heating a pipeline comprising:
a heater operable to heat a fluid;
a supply line positioned adjacent to the heater, wherein the heated fluid is operable to flow through the supply line away from the heater;
a return line positioned adjacent to the heater, wherein the heated fluid is operable to flow through the return line back to the heater; and
a strap having a first end, a second end, and a middle portion between the first end and the second end, wherein:
the strap forms a first pocket when the first end is folded over and adjustably attached to the middle portion of the strap, wherein the first pocket is configured to hold the supply line;
the strap forms a second pocket when the second end is folded over and adjustably attached to the middle portion of the strap, wherein the second pocket is configured to hold the return line;
the strap is placed on the pipeline such that:
the first pocket rests against the pipeline and holds the supply line in thermal contact with a first portion of the pipeline; and
the second pocket rests against the pipeline and holds the return line in thermal contact with a second portion of the pipeline.

2. The system of claim 1, wherein the first end and the second end of the strap are made of hook fastening material on a first side and a thermally conductive material on a second side.

3. The system of claim 2, wherein the middle portion of the strap is made of hook fastening material on the first side and thermally conductive material on the second side.

4. The system of claim 1, wherein the strap is placed on the pipeline such that the first pocket and the second pocket are positioned at or above an equator of the pipeline.

5. The system of claim 1, wherein the strap is placed on the pipeline such that the first pocket and the second pocket are removably coupled to the pipeline using clasps.

6. The system of claim 1, further comprising an insulated blanket wrapped around at least a portion of the supply line and the return line.

7. The system of claim 1, wherein the supply line is connected to the return line.

8. A method for heating a pipeline, comprising:
positioning a strap on the pipeline, the strap comprising a first end, a second end, and a middle portion between the first end and the second end, wherein:
the strap forms a first pocket when the first end is folded over and adjustably attached to the middle portion of the strap, wherein the first pocket is configured to hold a supply line;
the strap forms a second pocket when the second end is folded over and adjustably attached to the middle portion of the strap, wherein the first pocket is configured to hold a return line;
holding a supply line in thermal contact with a first portion of the pipeline using the first pocket; and
holding a return line in thermal contact with a second portion of the pipeline using the second pocket.

9. The method of claim 8, wherein the first end and the second end of the strap are made of hook fastening material on a first side and a thermally conductive material on a second side.

10. The method of claim 9, wherein the middle portion of the strap is made of hook fastening material on the first side and thermally conductive material on the second side.

11. The method of claim 8, wherein the strap is placed on the pipeline such that the first pocket and the second pocket are positioned at or above an equator of the pipeline.

12. The method of claim 8, wherein the strap is placed on the pipeline such that the first pocket and the second pocket are removably coupled to the pipeline using clasps.

13. The method of claim 8, further comprising wrapping at least a portion of the supply lines and the return lines using an insulated blanket.

14. The method of claim 8, wherein the supply line is connected to the return line.

15. A system for heating a pipeline, comprising:
a strap with a first end, a second end, and a middle portion between the first end, wherein:
the first end of the strap loops through an eyelet of a first clasp that is removably coupled to a first portion of a pipeline, and the strap forms a first pocket when the first end of the strap is folded over and adjustably attached to the middle portion of the strap;
the second end of the strap loops through an eyelet of a second clasp that is removably coupled to a second portion of the pipeline, and the strap forms a second pocket when the second end of the strap is folded over and adjustably attached to the middle portion of the strap;
the first pocket holds a supply line carrying heated fluid supplied by a heater and the first pocket positions the supply line in thermal contact with the first portion of the pipeline when the strap is placed on the pipeline; and
the second pocket holds a return line returning the heated fluid to the heater and the second pocket positions the return line in thermal contact with the second portion of the pipeline when the strap is placed on the pipeline.

16. The system of claim 15, wherein the supply line is connected to the return line.

17. The system of claim 15, wherein the first end and the second end of the strap are made of hook fastening material on a first side and a thermally conductive material on a second side.

18. The system of claim 17, wherein the middle portion of the strap is made of hook fastening material on the first side and thermally conductive material on the second side.

19. The system of claim 15, wherein the strap is placed on the pipeline such that the first pocket and the second pocket are positioned at or above an equator of the pipeline.

20. The system of claim 15, wherein the pipeline has a fill level and the strap is placed on the pipeline such that the first pocket and the second pocket are positioned below the fill level of the pipeline.

* * * * *

UNITED STATES PATENT AND TRADEMARK OFFICE
CERTIFICATE OF CORRECTION

PATENT NO. : 10,101,055 B2
APPLICATION NO. : 15/724351
DATED : October 16, 2018
INVENTOR(S) : Myerholtz et al.

Page 1 of 1

It is certified that error appears in the above-identified patent and that said Letters Patent is hereby corrected as shown below:

On the Title Page

Item (12) delete "Myerholtz et al." and insert --Myerholtz, Jr. et al.--.

Item (72) Inventors, first inventor name should read --Robert M. Myerholtz, Jr., Weston, OH (US)--.

Signed and Sealed this
Eleventh Day of December, 2018

Andrei Iancu
*Director of the United States Patent and Trademark Office*